INVENTOR.
CECIL R. WARD

United States Patent Office 3,208,842
Patented Sept. 28, 1965

3,208,842
GLASS DRAWING APPARATUS
Cecil R. Ward, Gibsonia, Pa., assignor to Pittsburgh Plate Glass Company, Pittsburgh, Pa., a corporation of Pennsylvania
Filed Sept. 30, 1960, Ser. No. 59,743
2 Claims. (Cl. 65—203)

This invention relates to the manufacture of sheet glass by continuous drawing from a bath of molten glass and provides improved methods and apparatus for producing drawn sheet glass of improved appearance wherein the usual characteristic wave pattern, i.e., transverse thickness variations which appear as bands of ribs, extending generally in the direction of the draw, is eliminated or materially reduced.

These characteristic wave patterns primarily occur because of non-uniform cooling of the sheet across its width. To provide uniform cooling of the sheet, it is desirable to allow the heat loss to take place substantially entirely by radiation rather than by a transfer to convection currents or a combination of radiation and a transfer to convection currents.

In conventional processes of drawing sheet glass, a natural stack is induced by the geometry of the sheet, bath and drawing chamber wherein there is a transfer of heat from the bath and sheet at relatively elevated temperatures to the cooler ambient air within the chamber producing a convection flow of air in the direction of the draw and out of the chamber. The movement of the heated air in the direction of the draw results in zones of reduced pressure at the base or maniscus of the sheet, so that colder air is drawn to the reduced pressure zones. Air enters the drawing chamber at the juncture of the chamber and the drawing machine and leaks into the chamber from cracks, crevices, or the like in the chamber walls. Colder air flowing to the zones of low pressure is chilled by moving generally across coolers, which are disposed within the chamber slightly above the surface of the bath and on the opposite sides of the sheet to accelerate the setting of the glass. As readily understood, the temperature of entering air will be non-uniform because of differences in temperature of the sources of this air, and this condition will persist due to differences in paths taken by this air in the drawing chamber and, also, due to conditions within the kiln. These temperature differences cause non-uniform velocities within the drawing chamber. The colder air of non-uniform velocities flows to the reduced pressure zones and disturbs the relatively thin surface adhering film moving with the glass causing non-uniform heat transfer across the sheet, thereby affecting the formation of the glass in the area where the glass undergoes the transition from fluid to solid state. Being in the plastic state and under stress, the glass is unequally attenuated to form a characteristic longitudinal wave pattern.

Another characteristic wave pattern extends diagonally and usually exists on the outer margins of the sheet. This diagonal wave pattern may be so severe, in some instances, as to extend entirely across the sheet. The diagonal wave pattern, when superimposed on a longitudinal wave pattern, provides a pattern referred to in the sheet glass industry as "batter" or "dapple," and is the result of currents of colder air flowing from the vicinity of the ends of the coolers and the ends of the drawing chamber to the zones of low pressure at the base of the sheet. These currents of air are commonly referred to as "end-around currents."

Many arrangements have been proposed to improve the appearance of drawn sheet glass. One such arrangement is taught by Brichard in United States Patent No. 2,693,-052 wherein burners or suction means are disposed just above the surface of the bath to eliminate flow of relatively cold air to the base of the glass sheet and to eliminate flow of air along the sheet in the direction of the draw. Thus, either no air flow takes place along the sheet or else such air flow as takes place moves along the sheet in a direction opposite to that of the draw.

It has been found that the appearance of drawn sheet glass may be materially improved if, instead of eliminating the flow of air to the base of the sheet, the flow of air to and from the base of the sheet is controlled or regulated, so as to be diminished but not eliminated. This control or regulation of the flow of air to the base of the sheet does not eliminate but reduces the flow of air along the sheet in the direction of the draw. The latter flow of air forms an undisrupted uni-directional protective layer or envelope surrounding the sheet and moving at a velocity sufficiently low so that it does not disturb the relatively thin insulating surface adhering film of air surrounding the sheet. This reduction of flow of air to and from the base of the sheet eliminates or materially reduces the non-uniform disturbance of the relatively thin surface adhering film of air surrounding the sheet, so that variations in attenuation of the sheet are materially reduced, thus providing an improvement in the appearance of the sheet.

The provision of a protective envelope of air moving at a sufficiently low velocity in the direction of the draw results in a minimized cooling of the glass sheet by heat transfer through convection currents and thereby allows more uniform cooling of the sheet by radiation to the usual coolers spaced from the sheet and located slightly above the surface of the bath of molten glass. The end-around currents are also reduced and/or rendered ineffective, so that the usual diagonal wave pattern is eliminated. Thus, a method and apparatus have been devised for eliminating the undesirable effects of air currents which naturally occur in a sheet glass drawing device while retaining their desirable effects. Stated somewhat differently, a method and apparatus have been devised for reducing the flow of air to and from the base of a glass sheet being drawn to such a degree as to minimize undesirable effects, while retaining sufficient flow of air so as to form a protective envelope surrounding the sheet in the direction of the draw and obtain new desirable effects.

Briefly, the invention herein disclosed utilizes novel means for creating a stack effect upon the air within the drawing chamber behind each cooling member, in this way counteracting the normal cyclic movement of cool air between the cooling members and the remote parts of the drawing chamber which would, if not diverted, cause an uneven cooling of the glass sheet in the critical forming zone.

Therefore, the primary object of this invention is the provision of improved methods and apparatus for improving the appearance of drawn sheet glass.

Another object of this invention is the provision of methods and apparatus for eliminating the undesirable effects which occur in a sheet glass drawing chamber because of the natural air currents while retaining the desirable effects of these air currents, thereby materially improving the appearance of the sheet being drawn.

A still further object of this invention is the provision of improved method and apparatus for controlling and regulating air currents within drawing chambers which may be readily utilized in different apparatus with substantially uniform results and without interferring with the normal operation of the apparatus.

Other objects and features of this invention will be apparent from the following description and the appended drawings, which illustrate various embodiments of the invention and in which.

Figure 1:
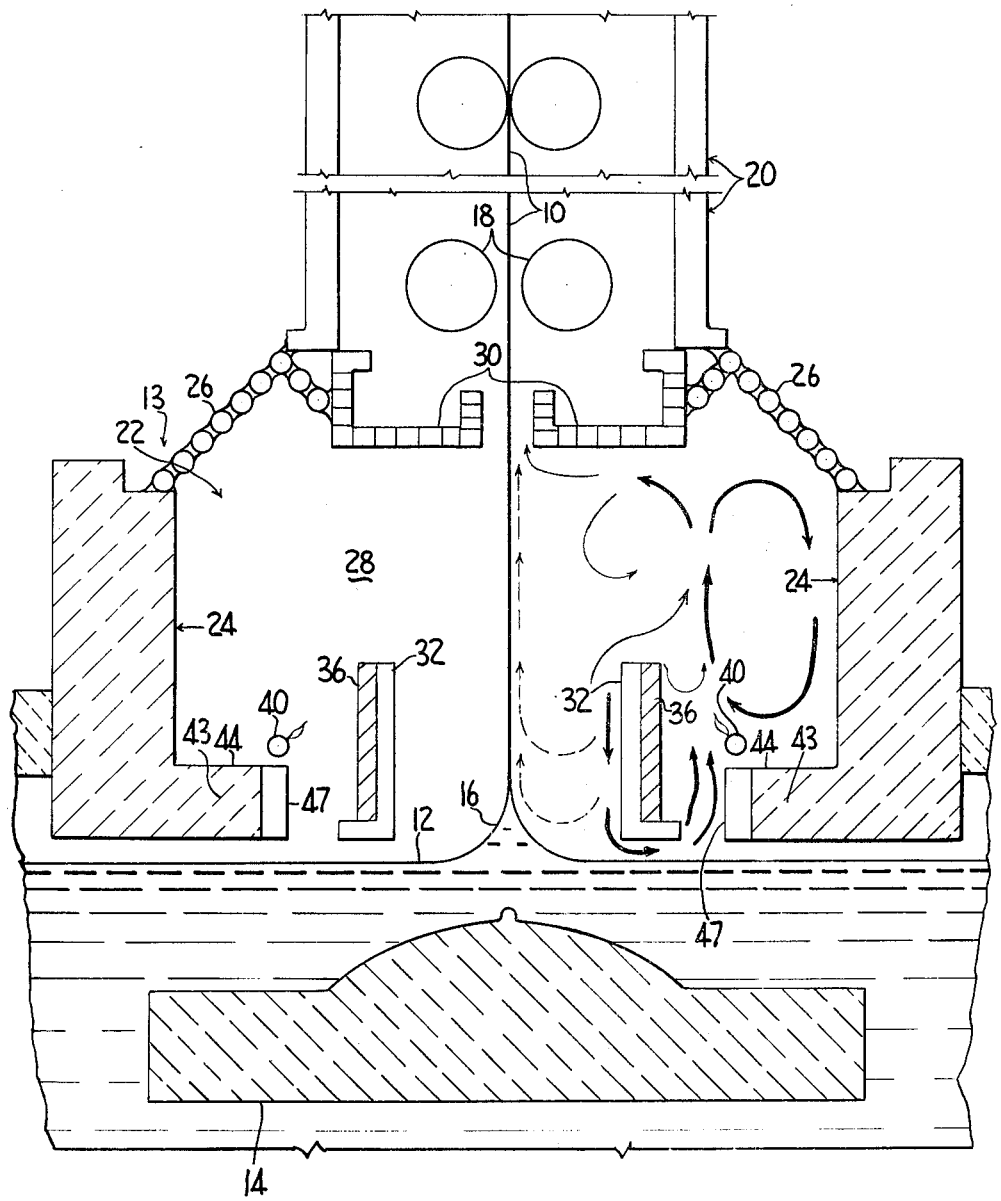
FIG. 1 shows diagrammatically a first embodiment of a drawing kiln according to this invention and the flow of principal air currents therein.
Figure 2:
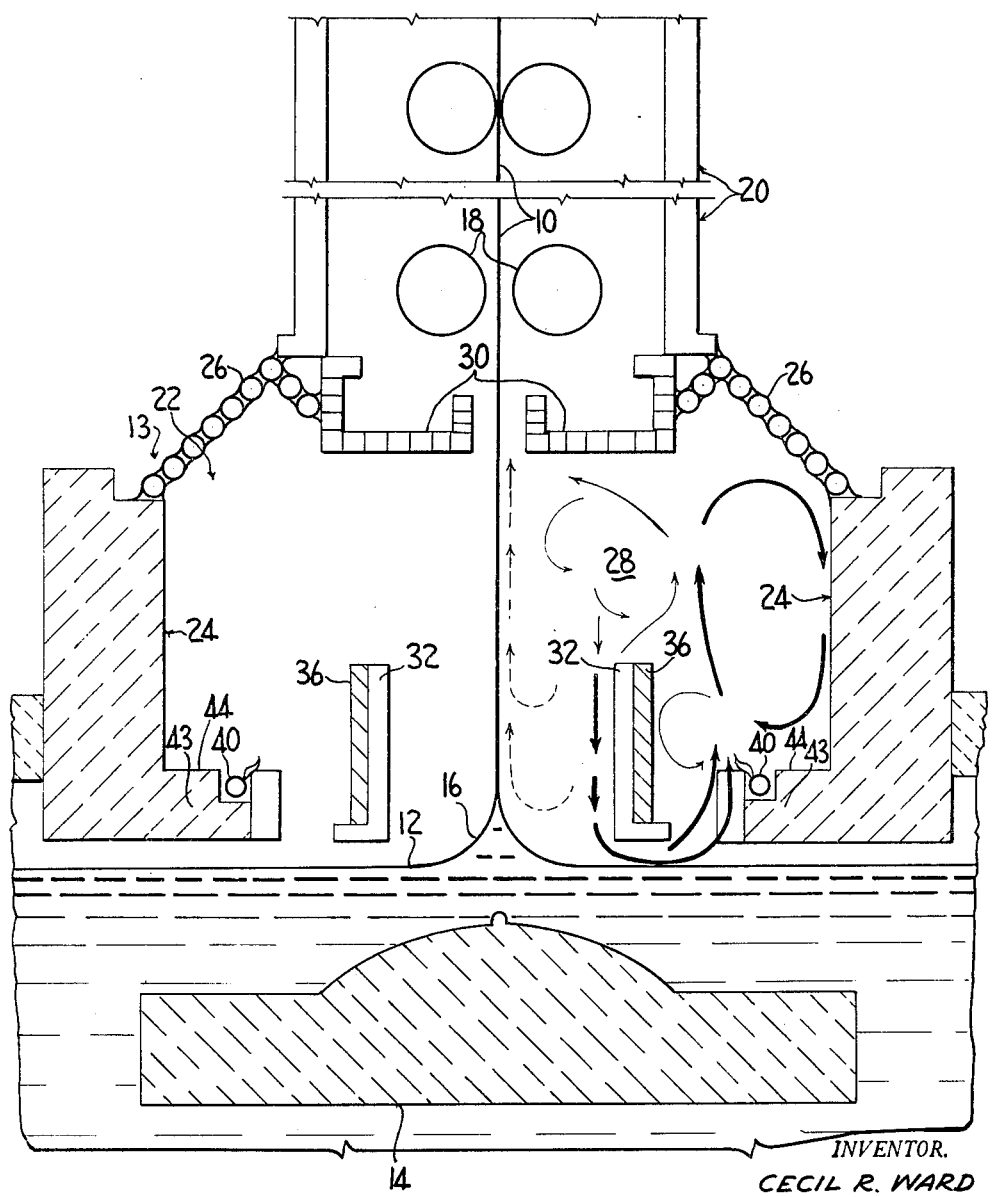
FIG. 2 shows diagrammatically another embodiment of this invention and the flow of principal air currents therein.

Turning to the drawings wherein like parts are identified with like reference characters, there is shown in each of FIGS. 1 and 2 a sheet of glass 10 being drawn from a bath 12 of molten glass in a drawing kiln generally indicated at 13 (only parts of which are shown but which is a conventional construction). A draw bar 14 extending transversely of the kiln 13 is submerged in bath 12. The glass sheet 10 in its viscous condition forms a base or meniscus 16 with the surface of the bath 12, and the sheet 10 is drawn from the bath 12 and through the drawing chamber 22 of a kiln 13 by means of drawing rolls 18 of a conventional drawing machine generally indicated at 20. The drawing chamber 22, as depicted in the drawings, is defined by bath 12 and conventional L-blocks 24, ventilator water coolers 26, end walls 28 and catch pans 30. The ventilator coolers 26 are each positioned between an L-block 24 and the base framework of the drawing machine 20 and extend substantially to the end walls 28 of the kiln 13. The base of the drawing machine 20 is substantially closed by means of the generally U-shaped catch pans 30, which are formed as coolers and are positioned so as to catch broken glass which may drop in the machine and thus prevent entry of fragments into the bath 12. These catch pans 30 also extend substantially to the end walls 28 of the kiln 13 and are constructed for the passage of cooling fluid, such as water. One leg of each catch pan 30 is disposed substantially parallel to and spaced from the sheet 10. Conventional water coolers 32 are provided for cooling sheet 10 by absorbing radiation from the sheet 10. The coolers 32 are spaced above the surface of the bath 12 and are positioned on opposite sides of the sheet 10 to extend substantially the width of the sheet.

So much of the apparatus as has been just described is common to the prior art and the instant invention and constitutes a normal or usual sheet glass drawing apparatus setup.

Reference is now made to FIG. 1 illustrating a basic embodiment of this invention wherein, in addition to the conventional apparatus elements in their usual structural arrangement, there are gas current injecting means, such as burners 40, extending substantially the width of the plane of draw of the glass sheet and positioned on the upper surface 44 of a foot portion 43 of each L-block. There is also a backing, such as sheet material 36, fastened to the back surface of each cooling member 32.

The burners 40 are pipes, each having closely spaced holes through which gas under pressure, such as combustible fluid, can escape, preferably normal to the longitudinal axis of the pipes. Upon combustion, the gaseous products form a substantially continuous sheet of heated gases extending across the chamber 22. The burners 40 are illustrated as having their flames directed upwardly at an inclined angle toward sheet 10, but the burners are so constructed as to be rotatable about their major axes to vary the inclined angle of the flames.

FIG. 2 illustrates another embodiment of the invention wherein the desirable features of the first two embodiments have been combined. Thus, the conventional coolers 32 are provided with a sheet material backing 36, and the burners 40 are positioned within the receses 42 of L-blocks 24.

In FIGS. 1 and 2, inclusive, of the drawings, the directions of the principal air currents within the drawing chamber 22 are shown by arrows for the right-hand portion of chamber 22. It is not necessary to show the principal air currents to the left of sheet 10 because they are mirror images of those shown. Relatively high, intermediate, and relatively low velocity air currents are shown in heavy solid, light solid, and broken lines, respectively.

The normally existing air currents in a drawing kiln are illustrated in FIG. 1 of James and Ward United States Patent No. 3,097,942, issued July 16, 1963, and are fully described therein.

In accordance with the present invention (referring to FIG. 1 which shows the arrangement utilizing burners and backed coolers) a backing, such as a sheet of insulating material, is secured to the back surface (facing away from the plane of draw) of each cooler in a suitable manner previously explained in conjunction with FIG. 6. This backing not only prevents the air behind the coolers from contacting the surface thereof and being cooled by conduction, but it also, and more importantly, absorbs heat emanating from the molten bath and from the front face of the foot of each L-block (which, by virtue of its proximity to the molten bath, has attained an elevated temperature) and transfers this heat to the surrounding air thus forming, in effect, a localized source of heat. Due to the location and the vertically extending planar configuration of the backing, it is ideally suited to create a strong upwardly directed stack of hot air behind the entire area of each cooler. It can be seen that this second stack flows in the same direction as the normal stack adjacent the glass sheet being drawn, but is displaced therefrom so as to counteract the cyclical movement of air from the secondary source of cold air which normally moves toward the base 16.

In addition to the backing on each cooler, burners 40, shown as having their flames angularly directed away from the L-blocks 24, have been placed on the top surface of the foot of each L-block to further alter or divert the path of movement of air in the zone of the secondary source of air, giving a cyclical path to this air. The burners 40 create zones of low pressure adjacent their locations so that air from the vicinity of the coolers 32, including that which may cascade downwardly across the front surface (facing the plane of draw) and would then normally flow to the base 16, will be drawn underneath and behind the coolers away from the base and into the second stack created by the backing on the coolers. In addition, the air flowing down the cooler upright portions of the L-blocks and along the foot portions thereof toward the base of the glass sheet will also be directed upwardly behind the coolers and into the second stack. Since the air flowing toward base 16 of sheet 10 is materially reduced, the effects of its non-uniformity in velocities and temperature does not disturb the relatively thin surface adhering film of air adjacent the sheet. Because this flow of air to the base 16 of the sheet 10 is not entirely eliminated, air still flows in the direction of the draw as the protective envelope. However, some of this air has been diverted into the cyclic path of movement of the air in the zone of the secondary source and is rendered ineffective to disturb the film of air adjacent the sheet 10.

As far as the end-around currents are concerned, these are drawn into the cyclic path of movement of the air in the zone of the secondary source and are rendered substantially ineffective to disturb the relatively thin surface adhering film of air adjacent the sheet. The overall effect is the material reduction or elimination in intensity of the usual wave patterns.

In FIG. 2, there is shown an arrangement wherein the burners are received in recessed portions of the L-blocks together with the addition of a sheet material backing 36 on the cooling members 32 in a similar manner to that shown in FIG. 1. This arrangement has been found to be most effective in eliminating the formation of an objectionable wave pattern, since it combines the desirable pattern controlling features of the two previous embodiments. A sheet material backing has been applied to the coolers to create a stack of rising warmer air behind each cooler in the same manner as in the embodiment of FIG. 1. In addition, the gas injecting means, such as burners 40, have been recessed in the foot portion of each L-block, to provide a properly located and relatively undisturbed flame pattern. The cumulative effect of these two features is to effectively divert and control the cooler air currents within the drawing chamber so as to allow an even rate of cooling of the sheet of glass substantially entirely by radiation, thereby virtually eliminating the undesirable wave pattern customarily found in drawn glass.

Generally speaking, for optimum results, the burners should have their flames directed from the vertical at an angle of approximately 45 degrees toward sheet 10; and when the L-block is not recessed, as in conventional L-blocks, the burners are preferably placed on the outermost edge or lip of the foot portion 43 of the L-blocks.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:

1. Apparatus for drawing sheet glass from a bath of molten glass comprising a drawing chamber partially defined by a pair of refractory members, one supported on each side of the plane of draw of the glass sheet and each having a substantially vertical extending portion and a substantially horizontally extending portion, the horizontally extending portion also extending toward the plane of draw, each of said refractory members being spaced above the bath of molten glass, a cooling member extending substantially the width of the plane of draw supported within the drawing chamber between the plane of draw and each refractory member, a gas current forming means comprising a burner located in said drawing chamber between each cooling member and closely adjacent the horizontal portion of a refractory member and extending substantially the width of the plane of draw for altering the path of ambient gas currents normally present in said chamber, and a sheet of heat absorbent insulating material for diverting the flow of gas in said chamber from the surface of each cooling member facing a respective refractory member, said sheet material covering a major portion of the back surface of each cooling member.

2. Apparatus as recited in claim 1 further including means forming a recess in the upper part of the horizontally extending portion of each refractory member to receive the gas stream forming means.

References Cited by the Examiner

UNITED STATES PATENTS

| 790,436 | 0/05 | Inman | 50—462 |
|---|---|---|---|
| 1,534,567 | 4/25 | Belden et al. | 65—203 XR |
| 1,656,103 | 1/28 | Drake | 65—204 |
| 1,673,916 | 6/28 | Mambourg | 65—202 |
| 1,830,788 | 11/31 | Forman | 65—85 |
| 1,836,411 | 12/31 | Trinks et al. | 65—203 |
| 2,284,348 | 5/42 | Tharp | 65—204 XR |
| 2,285,026 | 6/42 | Fulcher | 50—462 |
| 2,693,052 | 11/54 | Brichard | 65—204 XR |
| 2,694,272 | 11/54 | Spengler | 65—27 XR |
| 2,963,820 | 12/60 | Brichard | 65—204 XR |
| 2,991,590 | 7/61 | Brichard | 65—204 |

DONALL H. SYLVESTER, *Primary Examiner.*

IVAN R. LADY, *Examiner.*